United States Patent
Hu et al.

(10) Patent No.: US 11,716,150 B2
(45) Date of Patent: Aug. 1, 2023

(54) FIELD RECONSTRUCTION FOR AN OPTICAL RECEIVER

(71) Applicant: Nokia Solutions and Networks OY, Espoo (FI)

(72) Inventors: Qian Hu, Ludwigsburg (DE); Robert Borkowski, Ludwigsburg (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/811,194

(22) Filed: Mar. 6, 2020

(65) Prior Publication Data

US 2021/0281326 A1    Sep. 9, 2021

(51) Int. Cl.
*H04B 10/60* (2013.01)
*H04B 10/69* (2013.01)

(52) U.S. Cl.
CPC ....... *H04B 10/6911* (2013.01); *H04B 10/697* (2013.01); *H04B 10/6932* (2013.01); *H04B 10/6933* (2013.01)

(58) Field of Classification Search
CPC ............ H04B 10/6911; H04B 10/6932; H04B 10/6933; H04B 10/697
See application file for complete search history.

(56) References Cited

U.S. PATENT DOCUMENTS

| 9,374,171 B2 | 6/2016 | Randel et al. |
| 10,594,406 B2 | 3/2020 | Zhu et al. |
| 2003/0039010 A1* | 2/2003 | Akimoto ............... H04J 14/025 398/139 |
| 2004/0234273 A1* | 11/2004 | Sayyah ................. H04B 10/60 398/149 |
| 2006/0291868 A1* | 12/2006 | Yee ........................ H04B 10/50 398/152 |
| 2012/0177383 A1* | 7/2012 | Tanimura ............... H04B 10/61 398/158 |

(Continued)

OTHER PUBLICATIONS

Kuschnerov, Maxim, et al. "DSP for Coherent Single-Carrier Receivers." Journal of Lightwave Technology 27.16 (2009): 3614-3622.

(Continued)

*Primary Examiner* — Pranesh K Barua
(74) *Attorney, Agent, or Firm* — Mendelsohn Dunleavy, P.C.; Steve Mendelsohn; Yuri Gruzdkov

(57) ABSTRACT

An optical receiver capable of substantially measuring the phase and amplitude of a received intensity- or amplitude-modulated optical signal by performing digital-signal processing. In an example embodiment, a DSP of the receiver operates to reduce the detrimental effects of relative phase noise between the optical reference oscillator and optical carrier based on an optical pilot present in the received optical signal. The DSP may employ a sequence of digital filters configured to select a signal component that represents a non-vestigial modulation sideband and then perform signal equalization thereon. The signal equalization may include but is not limited to dispersion compensation. In some embodiments, the optical receiver can be a direct-detection optical receiver. In an example embodiment, the optical reference oscillator and optical carrier are generated using two respective independently running lasers that may or may not be co-located.

21 Claims, 12 Drawing Sheets

(56) References Cited

U.S. PATENT DOCUMENTS

| | | | |
|---|---|---|---|
| 2013/0011138 A1* | 1/2013 | Kim | H04L 27/2697 398/79 |
| 2013/0136449 A1* | 5/2013 | Liu | H04B 10/25137 398/65 |
| 2013/0315267 A1* | 11/2013 | Sasaki | H04L 27/2096 398/76 |
| 2015/0071656 A1* | 3/2015 | Oyama | H04B 10/2543 398/194 |
| 2015/0171972 A1* | 6/2015 | Xie | H04B 10/6162 398/205 |
| 2016/0127049 A1* | 5/2016 | Randel | H04B 10/5165 398/115 |
| 2016/0261351 A1* | 9/2016 | Raybon | H04B 10/079 |
| 2017/0054513 A1* | 2/2017 | Guo | H04L 5/0048 |
| 2017/0201330 A1* | 7/2017 | Zhou | H04B 10/697 |
| 2019/0132164 A1* | 5/2019 | Yu | H04B 10/5161 |
| 2019/0181962 A1* | 6/2019 | Ibragimov | H04B 10/6165 |
| 2020/0028592 A1 | 1/2020 | Chen et al. | |
| 2021/0036798 A1* | 2/2021 | Soares Luis | H04J 14/06 |

OTHER PUBLICATIONS

Morsy-Osman, M., et al. "Feedforward carrier recovery via pilot-aided transmission for single-carrier systems with arbitrary M-QAM constellations," Optics Express 19.24 (2011): 24331-24343.

Cai, Yuancheng, et al. "RF pilot tone phase noise cancellation based on DD-MZM SSB modulation for optical heterodyne RoF link", Optics Communications 454 (2020): 124502 (6 pages).

Chagnon, Mathieu "Optical Communications for Short Reach." Journal of Lightwave Technology 37.8 (2019): 1779-1797.

Estarán, José Manuel, et al. "140/180/204-Gbaud OOK Transceiver for Inter- and Intra-Data Center Connectivity." Journal of Lightwave Technology 37.1 (2019): 178-187.

Hu, Qian, et al. "IM/DD Beyond Bandwidth Limitation for Data Center Optical Interconnects" Journal of Lightwave Technology 37.19 (2019): 4940-4946.

Randel, Sebastian, et al. "100-Gb/s Discrete-Multitone Transmission Over 80-km SSMF Using Single-Sideband Modulation With Novel Interference-Cancellation Scheme." 2015 European Conference on Optical Communication (ECOC), Valencia Spain, (2015): 1-3.

Mecozzi, Antonio, et al. "Kramers-Kronig coherent receiver." Optica 3.11 (2016): 1220-1227.

Chen, Xi, et al. "218-Gb/s Single-Wavelength, Single-Polarization, Single-Photodiode Transmission Over 125-km of Standard Singlemode Fiber Using Kramers-Kronig Detection." Optical Fiber Communication Conference. Optical Society of America (2017): Th5B.6 (3 pages).

Antonelli, Cristian et al. "Kramers-Kronig PAM Transceiver and Two-Sided Polarization-Multiplexed Kramers-Kronig Transceiver." Journal of Lightwave Technology 36.2 (2018): 468-475.

Li, Zhe, et al. "Comparison of digital signal-signal beat interference compensation techniques in direct-detection subcarrier modulation Systems" Optics Express 24.26 (2016): 29176-29189.

Li, Xiang et al. "Direct detection of pilot-assisted PAM-4 signalswith large phase noise tolerance" Optics Letters 44.22 (2019): 5457-5460.

Hu, Qian, et al. "Novel Optical Field Reconstruction for IM/DD With Receiver Bandwidth Well Below Full Optical Signal Bandwidth." 45th European Conference on Optical Communication (ECOC), Sep. 22-26, Dublin, Ireland (2019): 1-4.

* cited by examiner

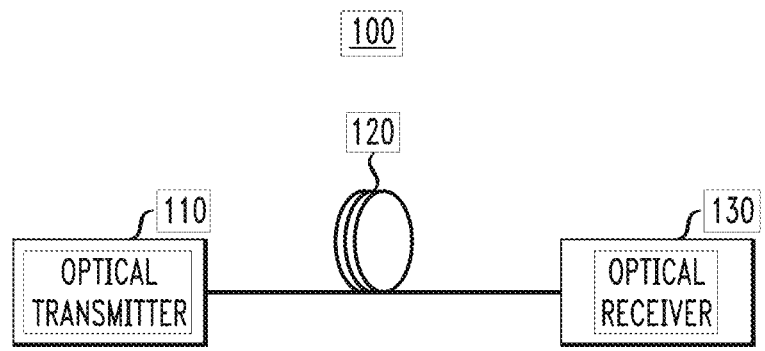
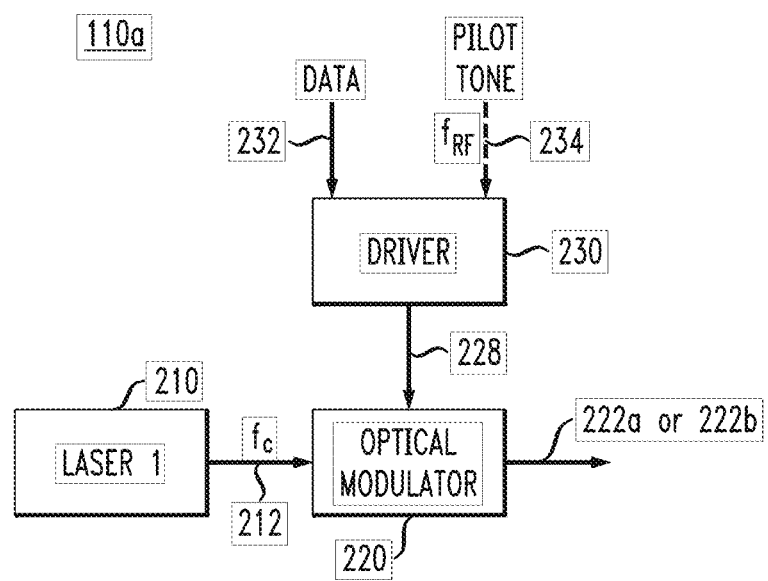

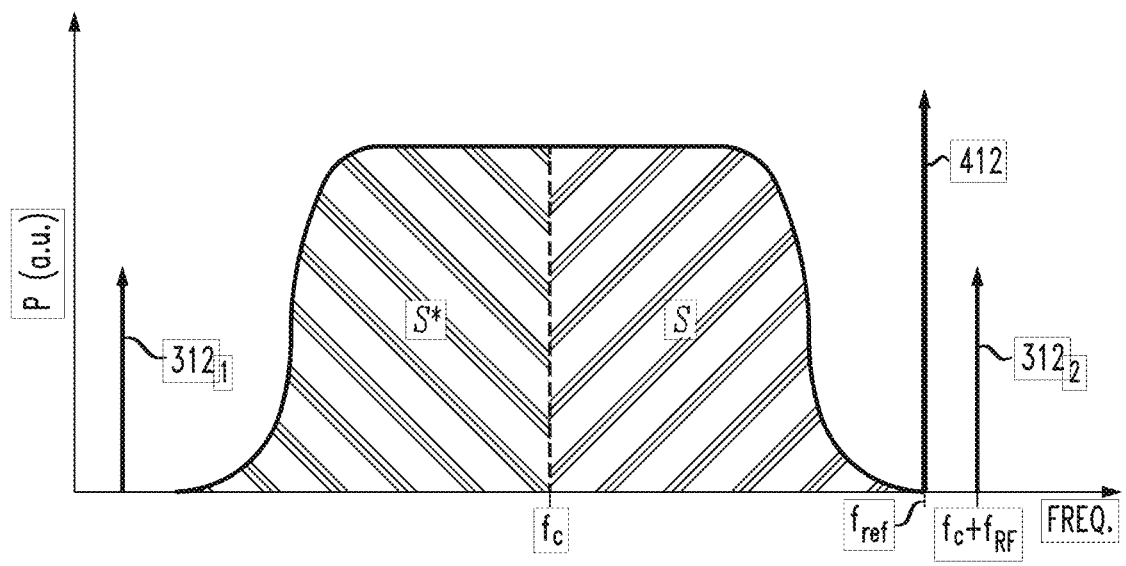
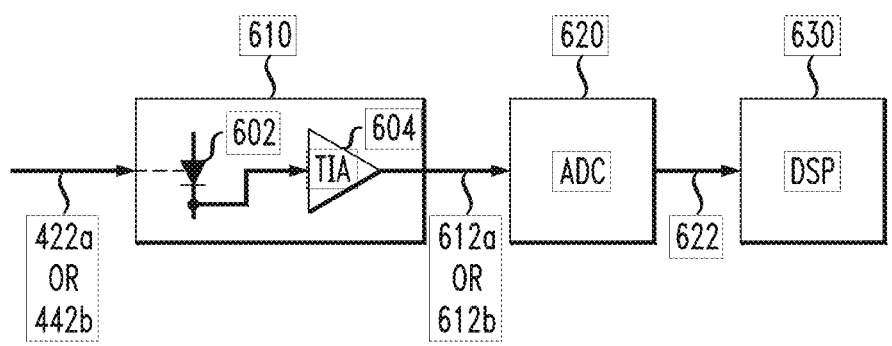

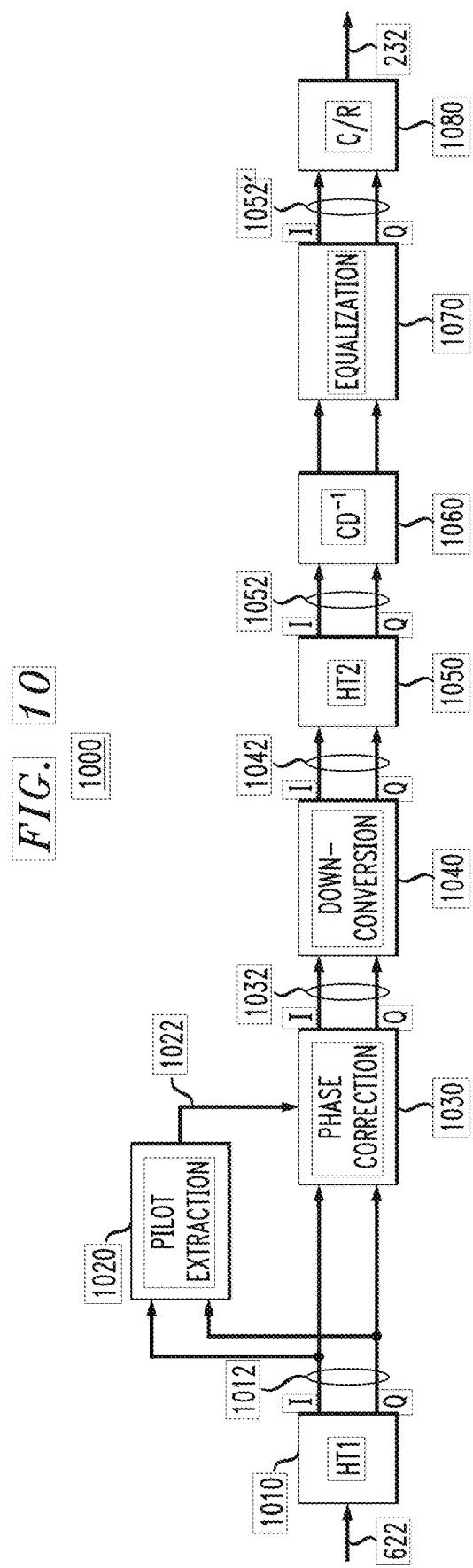

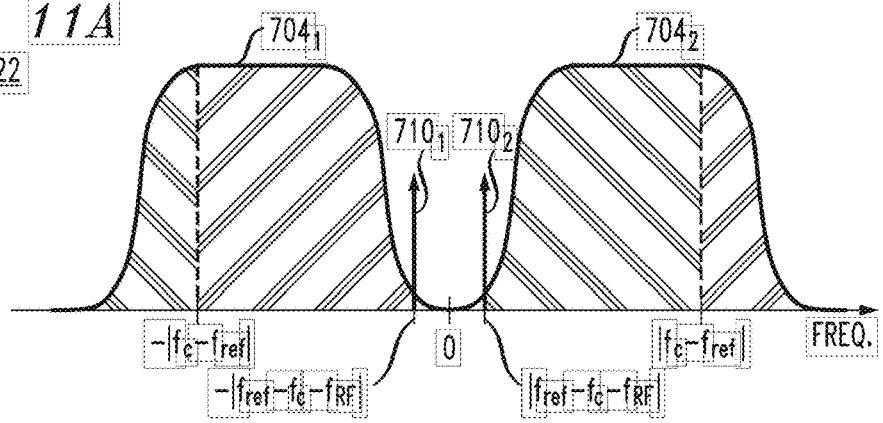
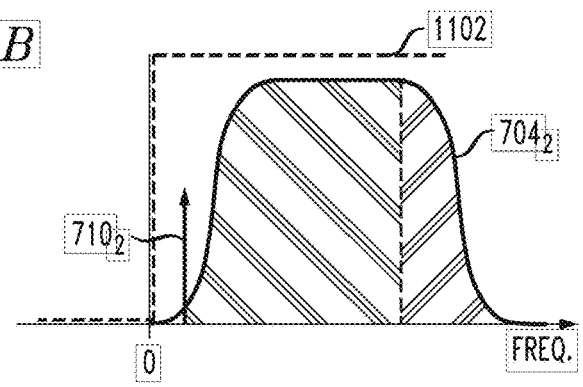
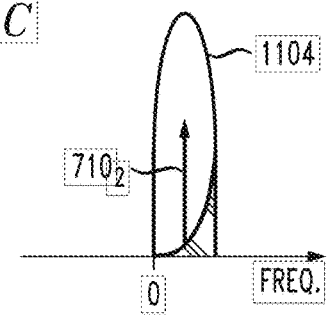
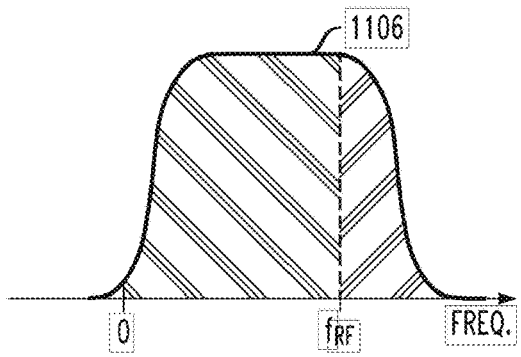

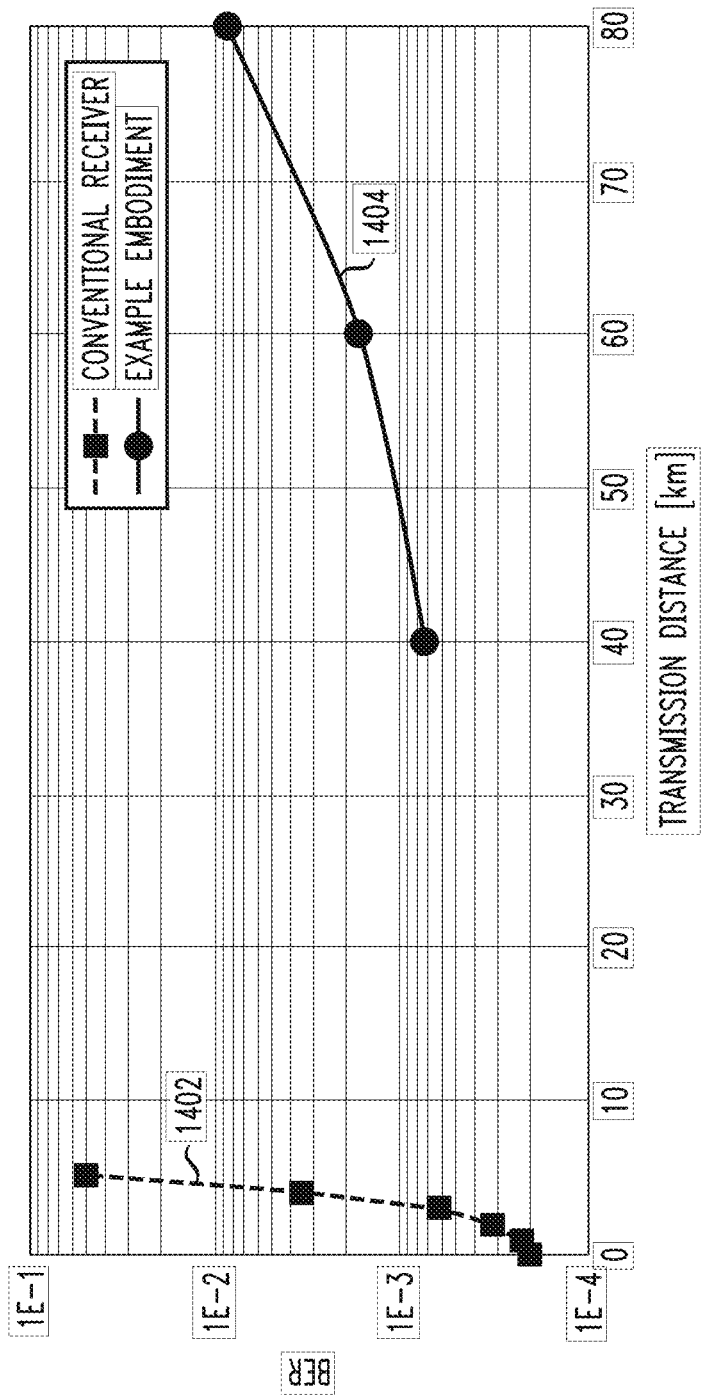

FIELD RECONSTRUCTION FOR AN OPTICAL RECEIVER

BACKGROUND

Field

Various example embodiments relate to optical communication equipment and, more specifically but not exclusively, to optical transmitters and receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

Some optical receivers are capable of detecting not only the amplitude of an optical signal, but also the signal's phase. As a result, the optical field can substantially be reconstructed at the receiver and then be used for signal equalization, e.g., directed at reducing the adverse effects of some optical-link impairments, such as chromatic dispersion (CD), polarization-mode dispersion (PMD), etc.

SUMMARY OF SOME SPECIFIC EMBODIMENTS

Disclosed herein are various embodiments of a direct-detection optical receiver capable of substantially measuring the phase and amplitude of a received intensity- or amplitude-modulated optical signal by performing digital signal processing. In an example embodiment, a digital signal processor (DSP) of the receiver operates to reduce the detrimental effects of relative phase noise between the optical reference oscillator and optical carrier based on an optical pilot present in the received optical signal. The DSP may employ a sequence of digital filters configured to select a signal component that represents a non-vestigial modulation sideband and then perform signal equalization thereon. The signal equalization may include but is not limited to dispersion compensation. In some embodiments, the optical receiver may be a square-law-detector-based optical receiver. In an example embodiment, the optical reference oscillator and optical carrier may be generated using two respective independently running lasers that may or may not be co-located.

According to an example embodiment, provided is an apparatus comprising an optical data receiver that comprises: a photodiode detector; and a digital signal processor connected to receive digital measurements of light by the photodiode detector at a sequence of times, the digital signal processor being configured to recover a data stream of an optical input signal from the digital measurements, each of the measurements measuring one or more combinations of the optical input signal and an optical frequency reference at one of times, the optical input signal having a data component produced by data-modulating an optical carrier and a pilot peak produced by modulating the optical carrier with a pilot frequency tone; and wherein the digital signal processor is configured to adjust said digital measurements to compensate for a frequency offset of the optical carrier with respect to the optical frequency reference based on evaluations of a phase or frequency of the pilot peak.

According to another example embodiment, provided is an apparatus comprising an optical data receiver that comprises: a front-end circuit; and a digital signal processor connected to receive, from the front-end circuit, digital measurements of one or more combinations of an optical input signal and an optical frequency reference at corresponding times, the optical input signal including a data band and a pilot peak produced by modulating an optical carrier with a data stream and a pilot frequency tone, respectively; wherein the front-end circuit has a narrower output bandwidth than a bandwidth of the one or more combinations of the optical input signal and the optical frequency reference; and wherein the digital signal processor is configured to determine the data stream modulated onto the optical carrier by adjusting the digital measurements to compensate for a frequency offset between the optical input signal and the optical frequency reference based on estimations from the digital measurements of a phase or frequency of the pilot peak of the optical input signal.

According to yet another example embodiment, provided is an apparatus comprising an optical data receiver that comprises a front-end circuit connected to a signal processor, the front-end circuit including a photodetector configured to generate an electrical output signal in response to an optical input signal applied thereto; wherein the front-end circuit has a limited electrical bandwidth with respect to an optical bandwidth of the optical input signal, the optical bandwidth including an optical reference oscillator and modulation sidebands of an optical carrier; and wherein the signal processor is capable of digitally reconstructing an optical field of the optical input signal by processing a digital form of the electrical output signal using a signal component thereof corresponding to an optical pilot present in the optical input signal.

BRIEF DESCRIPTION OF THE DRAWINGS

Other aspects, features, and benefits of various disclosed embodiments will become more fully apparent, by way of example, from the following detailed description and the accompanying drawings, in which:

FIG. 1 shows a block diagram of an example optical fiber communication system in which some embodiments may be practiced;

FIG. 2 shows a block diagram of an optical data transmitter that can be used in the optical fiber communication system of FIG. 1 according to an embodiment;

FIGS. 5A-5C graphically illustrate example spectral characteristics of optical output signals that may be generated by some embodiments of the optical data transmitter shown in FIG. 4;

FIG. 6 shows a block diagram of a direct-detection, optical data receiver that can be used in the optical fiber communication system of FIG. 1 according to an embodiment;

FIG. 10 shows a block diagram of a digital circuit that can be used in the optical data receiver of FIG. 9 according to an embodiment;

FIGS. 11A-11F graphically illustrate example spectral characteristics of some digital electrical signals that may be generated in the digital circuit of FIG. 10 according to an embodiment;

FIG. 14 graphically illustrates examples of potential performance improvements according to an embodiment.

DETAILED DESCRIPTION

Figure 3A:
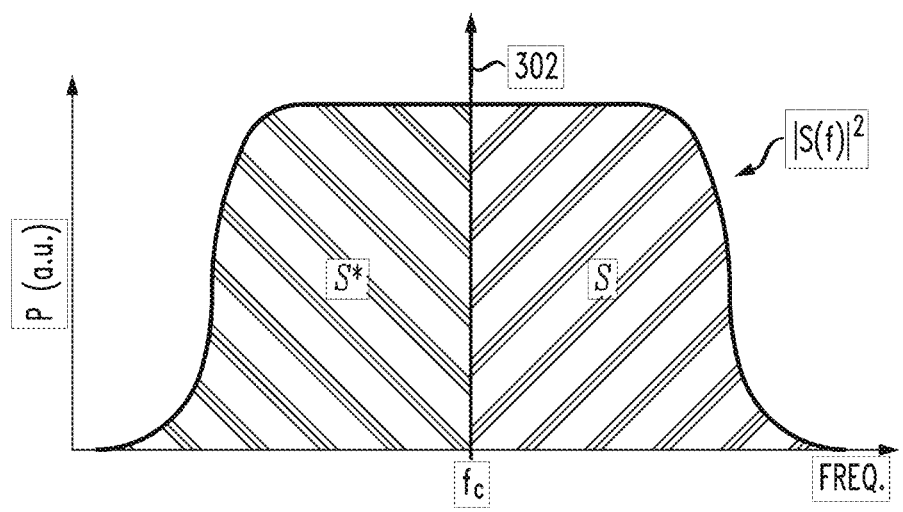
FIGS. 3A-3B graphically illustrate example spectral characteristics of optical output signals that may be generated by some embodiments of the optical data transmitter shown in FIG. 2.

The Kramers-Kronig (KK) algorithm is a conventional field-reconstruction algorithm that may be used in some direct-detection optical receivers. The KK algorithm is reviewed, e.g., in A. Mecozzi, et al., "Kramers-Kronig Coherent Receiver," Optica 3, pp. 1218-1227 (2016), which is incorporated herein by reference in its entirety.

Herein, optical-field reconstruction means determination of amplitude and phase of an optical signal, e.g., average amplitudes and phases for individual signal slots. Such optical-field reconstruction may or may not involve determining the amplitude and phase of both polarization components of the optical signal.

Herein, a direct-detection optical receiver may be configured to receive a data-carrying optical signal and an optical frequency-reference signal (e.g., an optical oscillator) together, e.g., from a remote optical transmitter, and to recover data from the data-carrying optical signal based on interference between the received data-carrying and frequency-reference signals in a light detector. The light detector is configured to measure only light intensities, e.g., the light detector may be a single photodiode. Also, the optical frequency-reference signal typically has a much narrower bandwidth than the data-carrying optical signal. In some embodiments, a direct-detection optical receiver does not employ an optical hybrid or an optical local oscillator to perform such data recovery and notably, does not use optical interference of said received optical signal with another light signal to determine the data carried by the data-carrying optical signal.

FIG. 1 shows a block diagram of an example optical fiber communication system 100 in which some embodiments may be practiced. System 100 comprises an optical data transmitter 110 and an optical data receiver 130 optically connected via an optical fiber communication link 120. In an example embodiment, link 120 comprises one or more spans of optical fiber or fiber-optic cable, e.g., one or more spans of standard single-mode optical fiber. In some embodiments, link 120 may include one or more optional optical amplifiers (not explicitly shown in FIG. 1), each connected between two corresponding fiber spans. In some embodiments, link 120 may include other optical elements, e.g., one or more optical filters, splitters, switches, etc. In some alternative embodiments, some portions or all of link 120 may be implemented using planar optical waveguides and/or free-space optical connections. In some embodiments, the distance between optical data transmitter 110 and optical data receiver 130 is between 1 km and 100 km, e.g., including lengths that are short enough to avoid the use of in-line optical amplification, such as example lengths encountered in intra-datacenter optical communications.

Example embodiments of optical data transmitter 110 are described in reference to FIGS. 2-5. Example embodiments of optical data receiver 130 are described in reference to FIGS. 6-14.

FIG. 2 shows a block diagram of optical data transmitter 110 according to an embodiment. This particular embodiment of optical data transmitter 110 is labeled 110a. Transmitter 110a comprises a laser source 210, an optical modulator 220, and an electrical drive circuit 230 connected as indicated in FIG. 2.

In operation, laser source 210 generates an optical carrier 212 having a carrier frequency $f_c$. Optical modulator 220 then operates to modulate optical carrier 212 in response to an electrical drive signal 228. A resulting modulated optical signal 222 may then be applied to optical communication link 120 (also see FIG. 1).

In one embodiment, optical modulator 220 can be an optical intensity modulator, e.g., an electro-absorption modulator (EAM). In such an embodiment, an electrical pilot-tone signal 234 indicated in FIG. 2 by the dashed arrow is not present or not used, and drive circuit 230 is configured to generate electrical drive signal 228, as known in the pertinent art, in response to an electrical data signal 232. Electrical data signal 232 may be an amplitude-modulated electrical data signal. For example, electrical data signal 232 can be a real-valued signal and/or can be represented by a sequence of real values. An example spectrum of the resulting modulated optical signal 222a is described below in reference to FIG. 3A.

In an alternative embodiment, optical modulator 220 can be an optical amplitude modulator, such as a Mach-Zehnder modulator (MZM) or an IQ modulator configured for pulse-amplitude modulation (PAM). In such an embodiment, drive circuit 230 is configured to generate electrical drive signal 228, as known in the pertinent art, in response to electrical data signal 232 and electrical pilot-tone signal 234 having a radio frequency $f_{RF}$. An example spectrum of the resulting modulated optical signal 222b is described below in reference to FIG. 3B.

In an example embodiment, electrical pilot-tone signal 234 may have predefined frequency and phase characteristics. For example, electrical pilot-tone signal 234 may be a sinusoidal wave having a fixed (i.e., constant) frequency and amplitude. In another example embodiment, electrical pilot-tone signal 234 may be controllably slowly dithered. Herein, the term "slowly" means that the one or more frequencies, with which the frequency $f_{RF}$ and/or amplitude of the pilot tone are modulated (dithered), are much smaller than the time-averaged frequency $<f_{RF}>$.

Figure 3B:
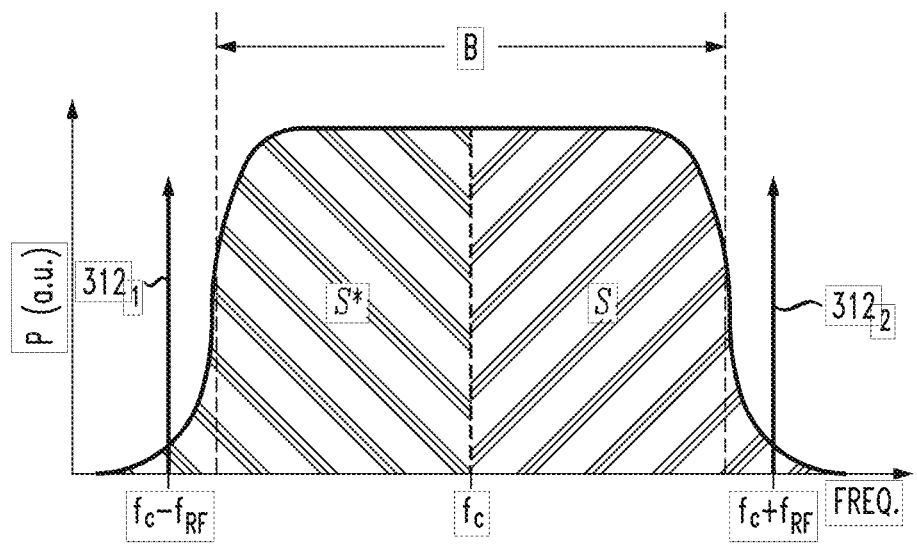

In one example embodiment, the frequency f may be selected such that, in optical signal 222b, an optical pilot corresponding to the electrical pilot-tone signal 234 is substantially out-of-band with respect to the data signal (also see FIG. 3B). In another example embodiment, the frequency $f_{RF}$ may be selected such that an optical pilot corresponding to the electrical pilot-tone signal 234 is in-band with respect to the data signal. In the latter embodiment, it may be beneficial if the the optical pilot and the data-carrying modulation sideband(s) overlap only to a small degree (e.g., have a relatively small integral of the spectral product due to the small spectral width of the optical pilot). This signal attribute typically ensures a high pilot-to-signal power ratio, which may be beneficial in at least some embodiments.

Drive circuit 230 may include, inter alia, conventional electrical circuitry for properly combining electrical data signal 232 and electrical pilot-tone signal 234. For example, an analog signal combiner or a digital adder may be used for this purpose as known in the pertinent art. A resulting combined signal may be amplified and optionally dc-biased to generate electrical drive signal 228.

In some embodiments, electrical signal 232 may be any real-valued time-dependent electrical waveform W(t), where t is time. For example, the waveform W(t) may not necessarily have encoded therein a data stream for transmission over a sequence of discrete time slots. Rather, the waveform W(t) may represent some analog "message" or signal.

It should also be noted that optical signal 222b is generated by concurrently using electrical data signal 232 and electrical pilot-tone signal 234 to generate the corresponding electrical drive signal 228. As a result, modulated optical signal 222b concurrently carries a data component (e.g., modulation sidebands S and S*) and at least one pilot peak (e.g., $312_2$), e.g., as illustrated in FIG. 3B.

FIG. 3A graphically illustrates example spectral characteristics of modulated optical signal 222a according to an embodiment. As already indicated above, optical signal 222a is generated by intensity modulation of optical carrier 212. As a result, the spectrum, S(f) of modulated optical signal 222a comprises modulation sidebands S and S* that are Hermitian-symmetric with respect to the carrier frequency $f_c$. A person of ordinary skill in the art will recognize that Hermitian symmetry implies that the corresponding symmetric spectral components of modulation sidebands S and S* can be represented by two complex values, with one being a complex conjugate of the other, i.e., $S(f_c-\delta)=S^*(f_c+\delta)$ for $\delta$ values within the sidebands.

The spectrum of modulated optical signal 222a further comprises a residual optical carrier 302. Although the intensity modulation in optical modulator 220 transfers some of the optical energy from the input optical carrier 212 into modulation sidebands S and S*, the input optical carrier is typically not fully depleted. The resulting attenuated optical carrier thus appears in the spectrum of modulated optical signal 222a as residual optical carrier 302.

FIG. 3B graphically illustrates example spectral characteristics of modulated optical signal 222b according to an embodiment. As already indicated above, modulated optical signal 222b is generated by amplitude modulation of optical carrier 212. Unlike intensity modulation, the amplitude modulation used herein substantially fully depletes the input optical carrier 212. As a result, a residual optical carrier similar to the residual optical carrier 302 (FIG. 3A) is not present in the spectrum of modulated optical signal 222b.

Similar to the spectrum of modulated optical signal 222a (FIG. 3A), the spectrum of modulated optical signal 222b comprises Hermitian-symmetric modulation sidebands S and S. The spectrum of modulated optical signal 222b further comprises optical pilots $312_1$ and $312_2$ generated in response to the electrical pilot-tone signal 234. Optical pilot $312_1$ has an optical frequency of $(f_c-f_{RF})$. Optical pilot $312_2$ has an optical frequency of $(f_c+f_{RF})$. In an example embodiment, the frequency $f_{RF}$ is selected such that $f_{RF} > B/2$, where B is the 3-dB bandwidth of the data-modulated signal (S*, S). This $f_{RF}$-value selection results in little or no overlap between the optical pilots $312_1$ and $312_2$ and data-modulated signal (S*, S), e.g., as graphically indicated in FIG. 3B.

As shown in FIG. 3B, modulated optical signal 222b has a data component (e.g., modulation sidebands S and S*) and at least one pilot peak (e.g., $312_2$) formed by concurrently modulating the same optical carrier (e.g., 212) with a data stream (e.g., 232) and a pilot frequency tone (e.g., 234), respectively.

Figure 4:
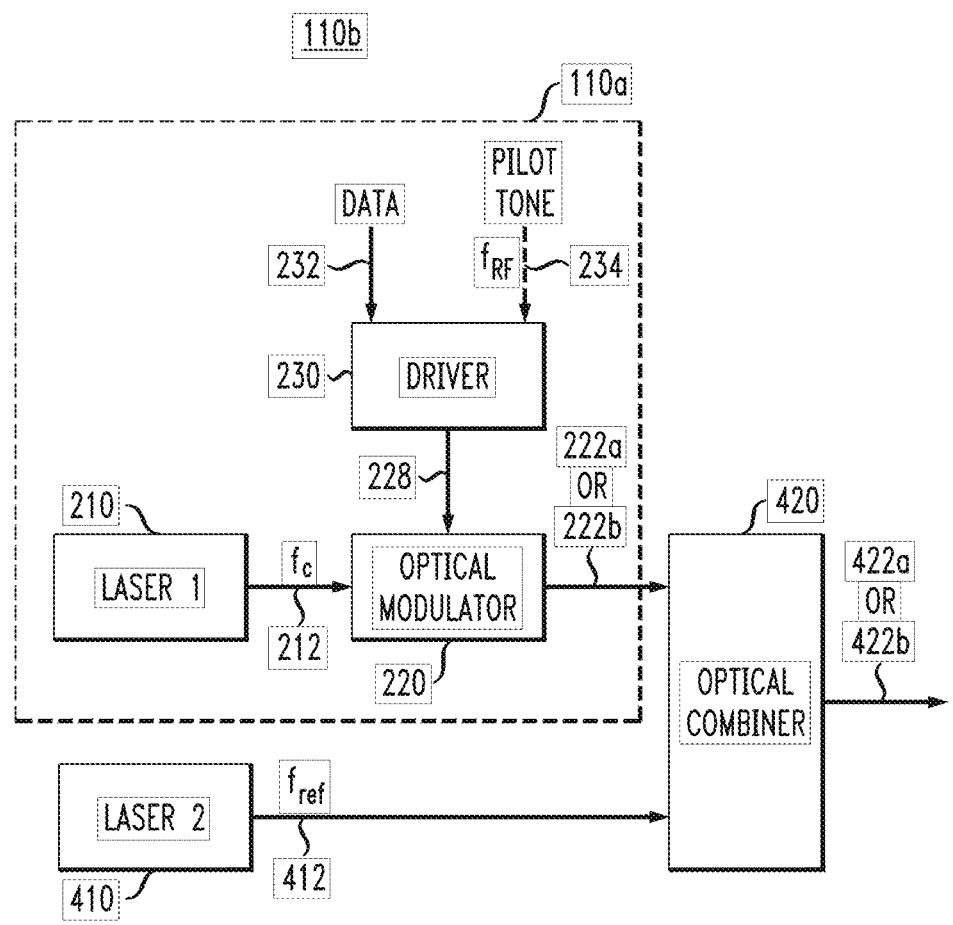
FIG. 4 shows a block diagram of an optical data transmitter that can be used in the optical communication system of FIG. 1 according to another embodiment.

FIG. 4 shows a block diagram of optical data transmitter 110 according to an alternative embodiment. This particular embodiment of optical data transmitter 110 is labeled 110b. Transmitter 110b comprises optical data transmitter 110a (FIG. 2), a laser source 410, and an optical combiner 420 connected as indicated in FIG. 4.

Laser source 410 is configured to generate an optical frequency-reference oscillator 412 having an optical frequency $f_{ref}$. Optical combiner 420 operates to optically combine the modulated optical signal 222a or 222b generated (as described above) by transmitter 110a and optical frequency-reference oscillator 412. A resulting modulated optical signal 422a or 422b (also see FIGS. 5A and 5B) may then be applied to optical communication link 120 (also see FIG. 1).

In an example embodiment, each of laser sources 210 and 410 may be a free-running laser. In such an embodiment, optical signals 212 and 412 may not be frequency-locked or phase-locked to one another. For example, optical signals 212 and 412 may have relatively uncorrelated phase noise. In contrast, optical pilots $312_1$ and $312_2$ (FIGS. 3B, 5B) have relatively correlated phase noise with optical carrier 212 by virtue of being produced by low-noise RF modulation thereof.

Figure 5A:
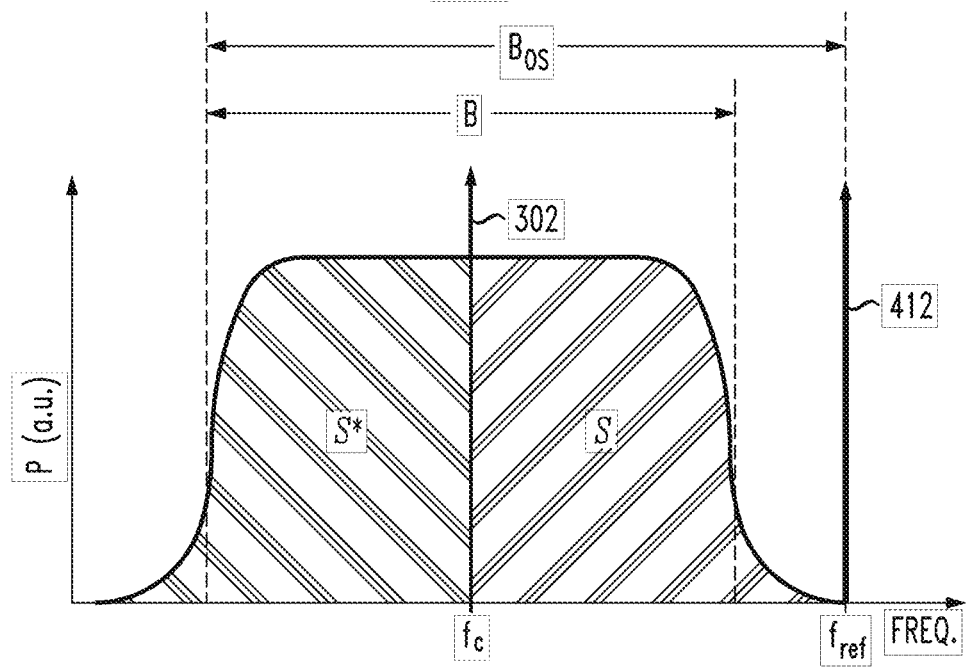

FIG. 5A graphically illustrates example spectral characteristics of modulated optical signal 422a according to an embodiment. Modulated optical signal 422a is generated in transmitter 110b (FIG. 4) by combining (i) modulated optical signal 222a (FIG. 3A) generated as described above by transmitter 110a and (ii) optical frequency-reference oscillator 412 generated by laser source 410. In this particular example, the optical frequency $f_{ref}$ is greater than the optical carrier frequency $f_c$, i.e., $f_{ref} > f_c$. In an alternative embodiment, the optical frequency $f_{ref}$ can be smaller than the optical carrier frequency $f_c$, i.e., $f_{ref} < f_c$. The difference between the optical frequencies $f_{ref}$ and $f_c$ is typically selected such that $|f_c-f_{ref}| > B/2$, e.g., as indicated in FIG. 5A. Modulated optical signal 422a has an optical bandwidth $B_{OS}$ that is indicated in FIG. 5A. Note that typically $B_{OS} > B$. However, in some embodiments, optical frequency-reference oscillator 412 may be slightly in band.

Figure 5B:
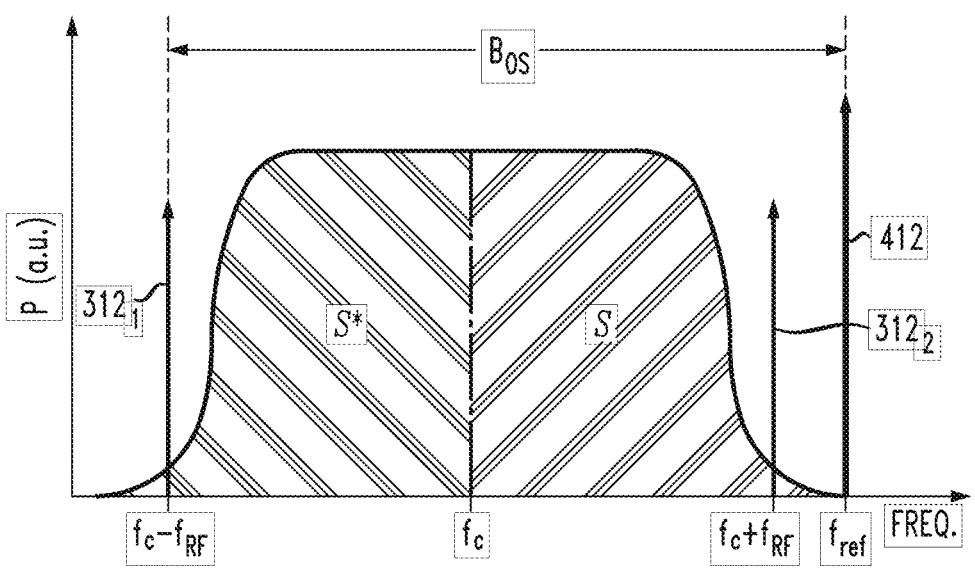

FIG. 5B graphically illustrates example spectral characteristics of modulated optical signal 422b according to an embodiment. Modulated optical signal 422b is generated in transmitter 110b (FIG. 4) by combining (i) modulated optical signal 222b (FIG. 3B) generated as described above by transmitter 110a and (ii) optical frequency-reference oscillator 412 generated by laser source 410. The optical reference oscillator's frequency $f_{ref}$ is typically selected such that the frequency $f_{RF}$ is smaller than the absolute value of the difference between the optical frequencies $f_{ref}$ and $f_c$, i.e., $|f_c-f_{ref}| > f_{RF}$. Modulated optical signal 422b has an optical bandwidth $B_{OS}$ that is indicated in FIG. 5B.

FIG. 5C graphically illustrates an alternative embodiment, in which the optical reference oscillator's frequency $f_{ref}$ is selected such that the frequency f is greater than the absolute value of the difference between the optical frequencies $f_{ref}$ and $f_c$, i.e., $|f_c-f_{ref}| < f_{RF}$. Based on the description provided herein, a person of ordinary skill in the art will understand how to make and use such an alternative embodiment without any undue experimentation.

FIG. 6 shows a block diagram of optical data receiver 130 according to an embodiment. This particular embodiment of optical data receiver 130 is labeled 130a. Receiver 130a comprises a photodetector 610, an analog-to-digital converter (ADC) 620, and a digital signal processor (DSP) 630. Herein, receiver 130a is configured to receive modulated optical signal 422a or 422b (also see FIGS. 5A-5B). As such, in system 100 (FIG. 1), receiver 130a can be paired up with transmitter 110b (FIG. 4).

In an example embodiment, photodetector 610 may comprise a single photodiode (e.g., 602) and a transimpedance amplifier (TIA; e.g., 604) connected in a single-ended electrical configuration. In such an embodiment, the photodiode is connected to receive light of the modulated optical signal 422a or 422b through link 120 and apply the resulting electrical signal to the TIA. A corresponding amplified electrical signal 612 generated by the TIA is then converted into digital form by ADC 620, and a resulting digital electrical signal 622 is applied to digital signal processor (DSP) 130 for processing and data recovery therein.

As used herein, the term "single-ended" refers to an electrical configuration in which the photocurrent generated by a single photodiode is being sensed and/or measured by the corresponding electrical circuit (e.g., a TIA) connected to the photodiode. The single photodiode so connected has a single optical input, a single electrical output, and a p-n junction that converts light received at the optical input into electrical current at the electrical output.

A single-ended electrical configuration should be contrasted with a balanced or differential electrical configuration in which the photocurrents generated by two serially connected photodiodes are driven through a common electrical terminal, and the combined photocurrent flowing through the common electrical terminal is sensed and/or measured by the corresponding electrical circuit connected thereto. A typical balanced photodetector has two optical inputs, one electrical output, and two nominally identical constituent photodiodes having separate and distinct p-n junctions. The electrical output is between the connected photodiodes. The quality of a balanced photodetector so constructed typically depends on the extent to which the two constituent photodiodes are matched to one another.

In some embodiments, the optoelectronic front end of receiver 130 may have a 3-dB bandwidth $B_{Rx}$), (e.g., see FIG. 7A) that is limited with respect to the bandwidth of modulated optical signal 422a or 422b. For example, the optoelectronic front end of receiver 130a (FIG. 6) may include photodetector 610 and possibly some other associated circuitry, such as ADC 620. Herein, the term "limited" means that the bandwidth $B_{Rx}$ is smaller than the optical bandwidth $B_{OS}$. In some embodiments, the bandwidth $B_{Rx}$ may approximately satisfy the following inequality:

$$|f_c - f_{ref}| \le B_{Rx} < |f_c - f_{ref}| + \frac{B}{2} \quad (1)$$

A person of ordinary skill in the art will understand that Eq. (1) implies that while the effective bandwidth of the optoelectronic front end is smaller than the bandwidth of the optical input signal, the effective bandwidth of the optoelectronic front end is not so small as to prevent DSP 630 from carrying out approximate optical-field reconstruction based on digital electrical signal 622, e.g., as described in reference to FIGS. 10-13. For example, in some embodiments, the bandwidth $B_{Rx}$ can be in the range between 55% and 90% of $B_{OS}$.

Figure 7A:
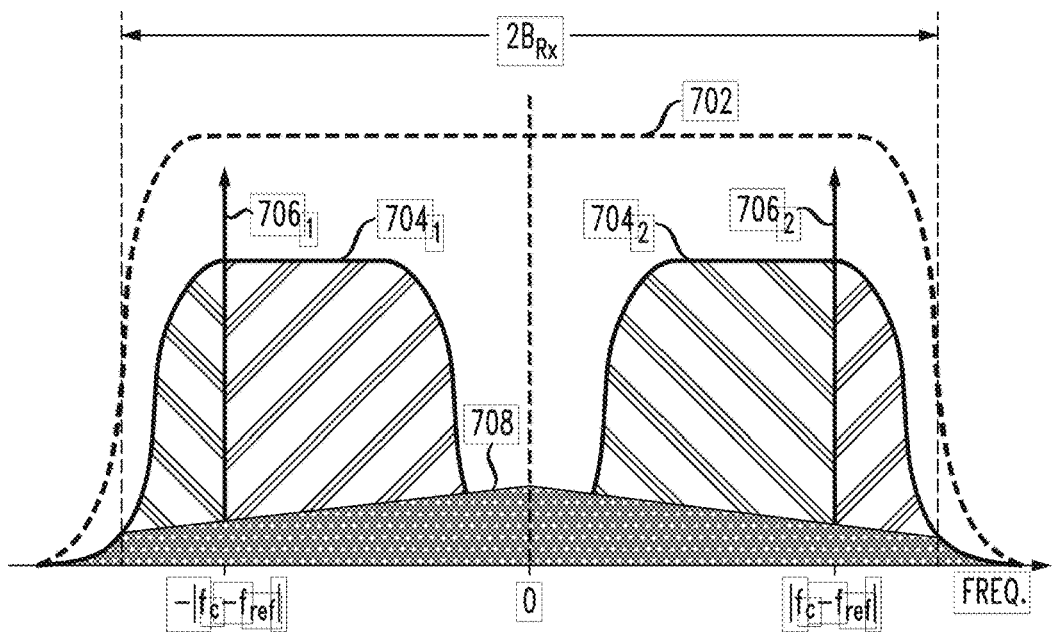
FIGS. 7A-7B graphically illustrate example spectral characteristics of electrical signals that may be generated by some embodiments of the direct-detection, optical data receiver shown in FIG. 6.

FIG. 7A graphically illustrates example spectral characteristics of electrical signal 612a generated in receiver 130a (FIG. 6) according to an embodiment. More specifically, photodetector 610 may generate electrical signal 612a in response to modulated optical signal 422a, said electrical signal being the down-converted beat frequency signal corresponding to the modulated optical signal at a non-zero intermediate frequency. A person of ordinary skill in the art will understand that the zero frequency in the spectrum of electrical signal 612a corresponds to the optical frequency $f_{ref}$ (also see FIG. 5A).

In an example embodiment, the spectrum of electrical signal 612a comprises data bands $704_1$ and $704_2$, narrow spectral bands (e.g., spectral lines) $706_1$ and $706_2$, and an SSBI band 708. Herein, SSBI stands for signal-to-signal beat interference.

Data bands $704_1$ and $704_2$ are generated by photodetector 610 by down-converting and performing band-limiting filtering of the data-modulated optical signal (S*, S) (also see FIG. 5A). The down-conversion causes data bands $704_1$ and $704_2$ to be relatively symmetric with respect to the zero frequency. The band-limiting filtering is represented in FIG. 7A by an effective transfer function 702 of the front end of receiver 130a. The transfer function 702 has a 3-dB bandwidth of approximately $2B_{Rx}$, as indicated in FIG. 7A (also see Eq. (1)).

Narrow spectral bands $706_1$ and $706_2$ are generated by photodetector 610 by down-converting the residual optical carrier 302. The down-conversion causes narrow spectral bands $706_1$ and $706_2$ to be symmetric with respect to the zero frequency.

Data band $704_1$ has two sub-bands, which are indicated by different hatching in FIG. 7A. The first one of these two sub-bands is located to the left of (i.e., farther away from the zero frequency than) narrow spectral band $706_1$, and the second one of these two sub-bands is located to the right of (i.e., closer to the zero frequency than) narrow spectral band $706_1$. A person of ordinary skill in the art will understand that the second sub-band corresponds to the optical modulation sideband S, while the first sub-band corresponds to the optical modulation sideband S* (also see FIG. 5A). The band-limiting filtering represented by the transfer function 702 causes the first sub-band to be spectrally narrower than the second sub-band. As such, the first and second sub-bands may be referred to as the vestigial sub-band and nonvestigial sub-band, respectively.

Data band $704_2$ also has two sub-bands, which are indicated in FIG. 7A by different hatching therein. A person of ordinary skill in the art will understand that the sub-bands of data band $704_2$ are qualitatively similar to the above-described sub-bands of data bands $704_1$.

SSBI band 708 is generated by photodetector 610 due to the presence of signal-to-signal beat products in the output thereof. The SSBI may be detrimental in that it can significantly reduce the effective signal-to-noise ratio (SNR). In at least some embodiments, the detrimental effects of SSBI can be substantially canceled in DSP 630, e.g., as described below in reference to FIGS. 12-13.

Figure 7B:
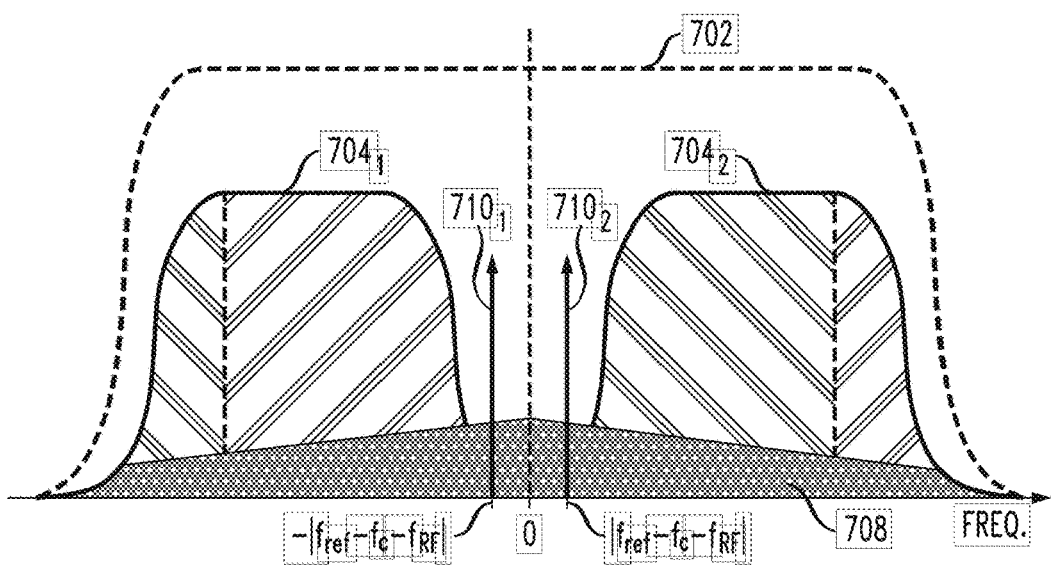

FIG. 7B graphically illustrates example spectral characteristics of electrical signal 612b generated in receiver 130a (FIG. 6) according to an embodiment. More specifically, photodetector 610 may generate electrical signal 612b in response to modulated optical signal 422b, said electrical signal being the down-converted beat frequency signal corresponding to the modulated optical signal at a non-zero intermediate frequency. A person of ordinary skill in the art will understand that the zero frequency in the spectrum of electrical signal 612b corresponds to the optical frequency $f_{ref}$ (also see FIG. 5B).

Similar to the spectrum of electrical signal 612a (FIG. 7A), the spectrum of electrical signal 612b comprises data bands $704_1$ and $704_2$ and SSBI band 708. However, narrow spectral bands $706_1$ and $706_2$ are not present therein. Instead, the spectrum of electrical signal 612b has narrow spectral bands (e.g., spectral lines) $710_1$ and $710_2$, both of which are generated by down-converting the optical pilot $312_2$ (see FIG. 5B). The pilot peak $312_1$ is filtered out due to being outside the bandwidth $B_R$), of the front end of receiver 130a.

Figure 8:
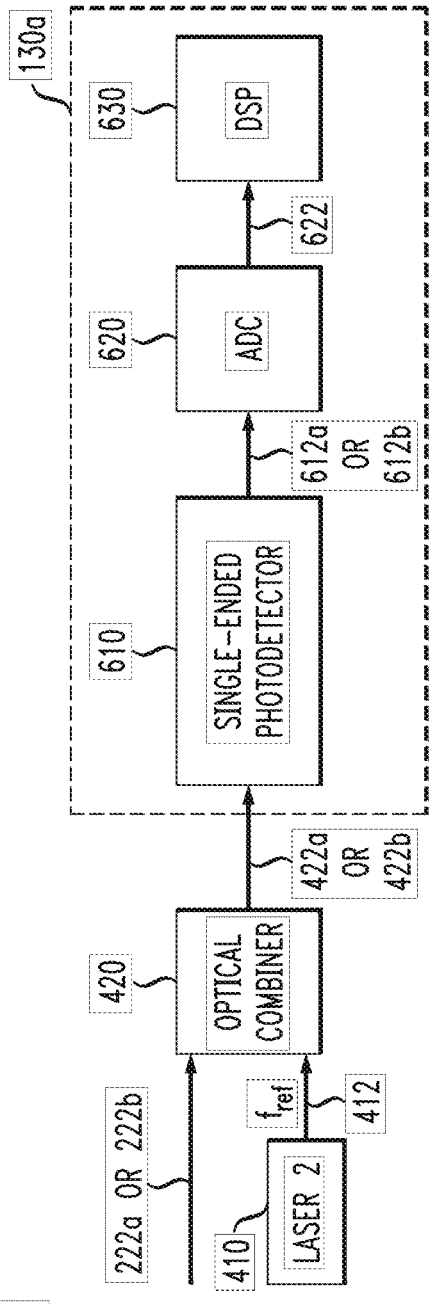
FIG. 8 shows a block diagram of an optical data receiver that can be used in the optical fiber communication system of FIG. 1 according to another embodiment.

FIG. 8 shows a block diagram of optical data receiver 130 according to another embodiment. This particular embodiment of optical data receiver 130 is labeled 130b. Herein, receiver 130b is configured to receive modulated optical signal 222a or 222b (also see FIGS. 3A-3B). As such, in system 100 (FIG. 1), receiver 130b can be paired up with transmitter 110a (FIG. 2).

Receiver 130b comprises receiver 130a, laser source 410, and optical combiner 420 connected as indicated in FIG. 8. Example functions and characteristics of laser source 410 and optical combiner 420 have been described above in reference to FIG. 4. Note however that, in the embodiment of FIG. 4, laser source 410 and optical combiner 420 are located at the corresponding transmitter 110. In contrast, in this embodiment, laser source 410 and optical combiner 420 are located at receiver 130. The optical output signal 422a or 422b generated by optical combiner 420 in receiver 130b is applied to the constituent receiver 130a, which processes this signal as described above in reference to FIGS. 6, 7A, and 7B. Example spectra of electrical signals 612a and 612b generated in receiver 130b are shown in FIGS. 7A and 7B, respectively.

Figure 9:
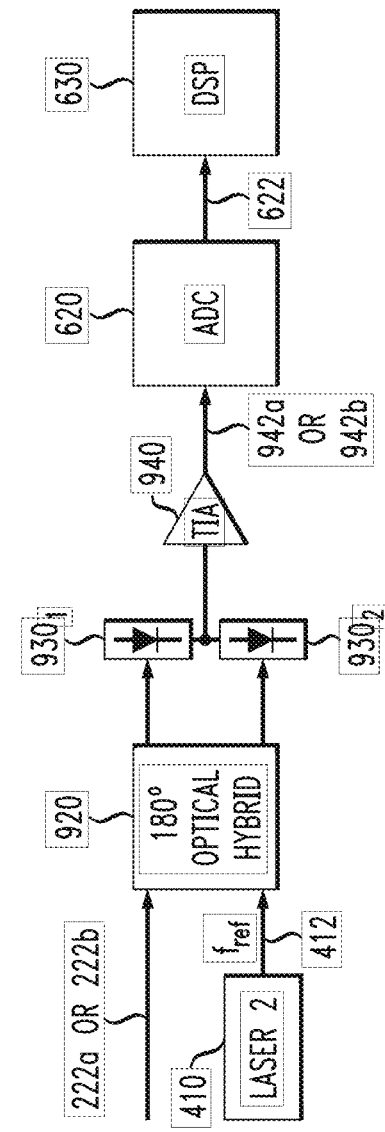
FIG. 9 shows a block diagram of an optical data receiver that can be used in the optical fiber communication system of FIG. 1 according to yet another embodiment.

FIG. 9 shows a block diagram of optical data receiver 130 according to yet another embodiment. This particular embodiment of optical data receiver 130 is labeled 130c. Herein, receiver 130c is configured to receive modulated optical signal 222a or 222b (also see FIGS. 3A-3B). As such, in system 100 (FIG. 1), receiver 130c can be paired up with transmitter 110a (FIG. 2).

Receiver 130c is a modification of receiver 130b (FIG. 8) obtained by making the following changes. Optical combiner 420 (FIG. 8) is replaced by a 180-degree optical hybrid 920. The single photodiode 602 of photodetector 610 is replaced by photodiodes $930_1$ and $930_2$ connected in a differential configuration, with the common electrical terminal being connected to a TIA 940. In some embodiments, TIA 940 may be of the same type as TIA 604 used in photodetector 610.

In operation, TIA 940 outputs an electrical signal 942a when receiver 130c receives modulated optical signal 222a. In an example embodiment, electrical signal 942a has a spectrum similar to that shown in FIG. 7A, except that the SSBI band 708 may not be present therein. In general, a well-balanced differential photodetector cancels the SSBI of the constituent individual photodiodes by subtracting the corresponding signal-to-signal beat products at the common terminal thereof.

TIA 940 outputs an electrical signal 942b when receiver 130c receives modulated optical signal 222b. In an example embodiment, electrical signal 942b has a spectrum similar to that shown in FIG. 7B, except that the SSBI band 708 may not be present therein for the above-explained reason.

FIG. 10 shows a block diagram of a digital circuit 1000 that can be used in DSP 630 according to an embodiment. For clarity, circuit 1000 is described in reference to its example use in receiver 130c (FIG. 9) and with continued reference to FIGS. 11A-11F. In operation, circuit 1000 processes digital signal 622 to recover the corresponding electrical data signal 232 (also see FIG. 2).

In an example embodiment, circuit 1000 comprises the following digital circuits connected as indicated in FIG. 10: (i) Hilbert-transform (HT) circuits 1010 and 1050; (ii) a pilot-extraction circuit 1020; (iii) a phase-correction circuit 1030; (iv) a frequency down-converter 1040; (v) a dispersion compensator ($CD^{-1}$) 1060; (vi) an equalizer 1070; and (vii) a complex-to-real (C/R) signal converter 1080. Herein, the acronym CD stands for chromatic dispersion.

FIG. 11A graphically illustrates example spectral characteristics of digital signal 622 received by circuit 1000 according to an embodiment. More specifically, ADC 620 of receiver 130c may generate the shown digital signal 622 in response to electrical signal 942b. As already indicated above, electrical signal 942b has a spectrum that is similar to the spectrum of electrical signal 612b shown in FIG. 7B, except that the SSBI band 708 is not present in electrical signal 942b. Accordingly, in FIG. 11A, the corresponding spectral bands of digital signal 622 are labeled using the same reference numerals as in FIG. 7B.

It should be noted here that digital signal 622 having the spectral characteristics shown in FIG. 11A is not conducive to conventional optical-field reconstruction methods, such as the above-mentioned KK algorithm. Moreover, the KK algorithm may break down because of the band-limited nature of digital signal 622 caused by the effective transfer function 702 (also see FIGS. 7A-7B and Eq. (1)). In contrast, an example embodiment of the optical-field reconstruction method disclosed herein enables sufficiently accurate optical-field reconstruction as further described below. The latter advantageously enables the application of dispersion compensation in DSP 630, e.g., using dispersion compensator 1060.

HT circuit 1010 operates to convert digital signal 622 (which is real-valued) into a corresponding complex-valued digital signal 1012 by removing negative-frequency components of digital signal 622. The real parts of the corresponding complex-valued digital stream are carried by a first component signal I of digital signal 1012. The imaginary parts of said digital stream are carried by a second component signal Q of digital signal 1012. Two copies of digital signal 1012 are applied to pilot-extraction circuit 1020 and phase-correction circuit 1030, respectively.

FIG. 11B graphically illustrates example spectral characteristics of digital signal 1012 generated by HT circuit 1010 according to an embodiment. Also shown in FIG. 11B is a spectral transfer function 1102 of HT circuit 1010, which is about the Heaviside step function having the 0-1 transition thereof at the zero frequency. This transfer function removes the pilot band $710_1$ and data band $704_1$ of digital signal 622 (see FIG. 11A). The remaining spectral bands are the pilot band $710_2$ and data band $704_2$. A person of ordinary skill in the art will understand that the shown spectrum represents a complex-valued time-domain signal because, unlike the spectrum of FIG. 11A, the spectrum of FIG. 11B does not possess the Hermitian symmetry.

Pilot-extraction circuit 1020 applies narrow band-pass filtering to the received copy of digital signal 1012 to isolate the pilot band $710_2$ and substantially reject the data band $704_2$. A resulting digital signal 1022 is then directed to phase-correction circuit 1030.

In an alternative embodiment, pilot-extraction circuit 1020 may be connected to receive digital signal 622 instead of digital signal 1012. A person of ordinary skill in the art will readily understand how to modify the above-described pilot-extraction circuit 1020 for such an alternative embodiment.

FIG. 11C graphically illustrates example spectral characteristics of digital signal 1022 generated by pilot-extraction circuit 1020 according to an embodiment. Also shown in FIG. 11C is a spectral transfer function 1104 of pilot-extraction circuit 1020, which is similar to that of a narrow band-pass filter (BPF). The width of the passband 1104 is selected to be appropriately narrow to pass through the pilot band $710_2$ and substantially reject the data band $704_2$.

Mathematically, digital signal 1022 can be approximated using the complex exponent as follows:

$$P(t) = P_0 \exp(j\varphi(t)) \qquad (2)$$

where $P_0$ is the amplitude of the pilot band $710_2$; and $\varphi(t)$ is the time-dependent phase. The time dependency of the phase $\varphi(t)$ is primarily caused by: (i) the non-zero frequency offset $|f_{ref}-f_c-f_{RF}|$ between optical frequency-reference oscillator 412 and optical pilot $312_2$ (also see FIG. 5B); and (ii) the relative phase noise of optical frequency-reference oscillator 412 and optical carrier 212 (e.g., see FIG. 4).

Phase-correction circuit 1030 operates to correct the phase of the received copy of digital signal 1012 based on digital signal 1022 provided by pilot-extraction circuit 1020. In an example embodiment, the phase correction can be performed in accordance with Eq. (3):

$$S_{out}(t) = S_{in}(t) \times \exp(-\varphi(t)) \qquad (3)$$

where $S_{out}(t)$ represents digital signal 1032; $S_{in}(t)$ represents digital signal 1012; and $\varphi(t)$ is the time-dependent phase determined based on digital signal 1022 (also see Eq. (2)). In addition, phase-correction circuit 1030 may optionally suppress the pilot band $710_2$, e.g., using appropriate notch filtering.

Note that Eq. (3) needs to be modified for the embodiment illustrated in FIG. 5C by removing the minus sign in the exponent.

FIG. 11D graphically illustrates example spectral characteristics of digital signal 1032 generated by phase-correction circuit 1030 according to an embodiment. In the spectrum of FIG. 11D, the pilot band $710_2$ is suppressed (not present). The shown spectrum comprises a data band 1106, which is produced by applying the phase correction expressed by Eq. (3) to the data band $704_2$ of FIG. 11B. In an example embodiment, this phase-correction operation causes: (i) a downshift (or an upshift in some embodiments) of the data band $704_2$ by the frequency $|f_{ref}-f_c-f_{RF}|$; and (ii) effective cancelation of the phase noise corresponding to the relative phase noise of optical frequency-reference oscillator 412 and optical carrier 212.

Frequency down-converter 1040 operates to further downshift the data band 1106 by the intermediate frequency $f_{RF}$ (also see signal 234 in FIG. 2). A resulting complex-valued digital signal 1042 is then directed to HT circuit 1050.

Figure 11E:
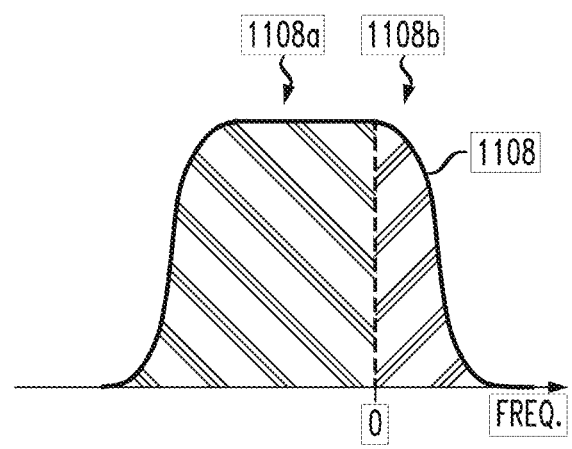

FIG. 11E graphically illustrates example spectral characteristics of digital signal 1042 generated by frequency down-converter 1040 according to an embodiment. The shown spectrum comprises a data band 1108, which is a down-shifted version of the data band 1106 of FIG. 11D. The sub-bands of the data band 1108 corresponding to negative and positive frequencies are labeled 1108a and 1108b, respectively. The sub-bands 1108a and 1108b may be referred to as the non-vestigial modulation sideband and vestigial modulation sideband, respectively.

HT circuit 1050 operates to generate complex-valued digital signal 1052 by removing the vestigial-sideband components of digital signal 1042. Digital signal 1052 is then directed to dispersion compensator ($CD^{-1}$) 1060.

Figure 11F:
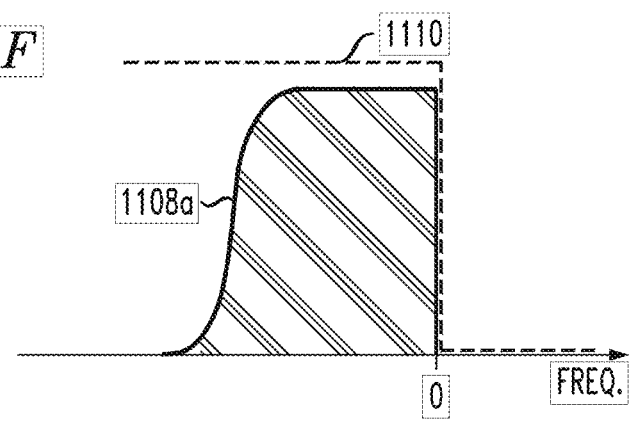

FIG. 11F graphically illustrates example spectral characteristics of digital signal 1052 generated by HT circuit 1050 according to an embodiment. Also shown in FIG. 11F is a spectral transfer function 1110 of HT circuit 1050, which is the approximate Heaviside step function having the 1-0 transition thereof at the zero frequency. This transfer function about removes the vestigial modulation sideband 1108b of digital signal 1108 while passing on the non-vestigial modulation sideband 1108a. Herein, non-vestigial modulation sideband 1108a represents the channel-impaired modulation sideband S of FIG. 5B.

In the shown embodiment, dispersion compensator 1060 and equalizer 1070 perform signal equalization directed at significantly reducing or substantially canceling at least some of the signal distortions imposed by the communication channel between the corresponding transmitter 110 and receiver 130 (also see FIG. 1). Specifically, dispersion compensator 1060 may be configured to perform chromatic-dispersion compensation, e.g., as known in the art. Equalizer 1070 may be configured to perform digital filtering directed at, e.g., at least reducing signal distortions caused by the analog front end of transmitter 110 and/or signal distortions caused by the analog front end of receiver 130. A digital output signal 1052' generated by equalizer 1070 provides an estimate of the modulation sideband S of FIG. 5B, wherein at least some of the above-mentioned channel impairments have been mitigated. A person of ordinary skill in the art will understand that the spectrum of digital signal 1052' is qualitatively similar to the spectrum of digital signal 1052 shown in FIG. 11F.

In an alternative embodiment, a single digital filter may be used instead of dispersion compensator ($CD^{-1}$) 1060 and equalizer 1070, with the single digital filter being configured to carry out at least the functions of both the dispersion compensator and equalizer.

In an example embodiment, C/R signal converter 1080 may generate an estimate of electrical signal 232 (FIG. 2) by passing through the real-part component signal I of digital signal 1052' and stopping the imaginary-part component signal Q thereof.

In an alternative embodiment, C/R signal converter 1080 may be configured to generate an estimate of electrical signal 232 (FIG. 2) by taking a projection of the complex values provided by digital signal 1052' on any fixed, arbitrarily oriented axis that passes through the origin of the complex I-Q plane.

Figure 12:
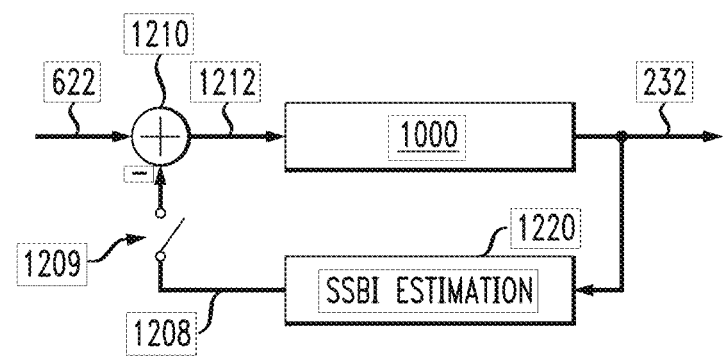
FIG. 12 shows a block diagram of a digital circuit that can be used in the optical data receiver of FIG. 6 or FIG. 8 according to an embodiment.

FIG. 12 shows a block diagram of a digital circuit 1200 that can be used in DSP 630 according to another embodiment. Circuit 1200 can be used, e.g., in DSP 630 of receiver 130a or 130b, i.e., of a direct-detection receiver. As already indicated above, a direct-detection receiver is typically impaired by SSBI.

Circuit 1200 comprises circuit 1000 (FIG. 10) and an SSBI-cancelation loop that comprises an SSBI-estimation circuit 1220 and an adder 1210. A switch 1209 may be used to engage or disengage SSBI-estimation circuit 1220, as may be needed for different iterations. For example, switch 1209 may be in the open state for the initial iteration and in the closed (connected) state for a subsequent iteration.

In operation, circuit 1200 processes digital signal 622 to generate an estimate of the corresponding electrical signal 232 (also see FIG. 2). SSBI-estimation circuit 1220 uses the output signal 232 generated by circuit 1000 to compute a corresponding SSBI estimate 1208, e.g., as known in the art. Adder 1210 is configured to generate a digital input signal 1212 for circuit 1000 by subtracting the SSBI estimate 1208 from digital signal 622. This operation causes the SSBI band 708 (e.g., see FIG. 7B) to be substantially canceled. As a result, digital input signal 1212 may have a spectrum similar to that of FIG. 11A. Circuit 1000 can process signal 1212, e.g., as described above, to generate an accurate estimate of electrical signal 232 at its output.

As a person of ordinary skill in the relevant arts will understand, a number of different algorithms may be implemented for SSBI estimation in the SSBI estimator 1220 of FIG. 12. For example, the article "Comparison of digital signal-signal beat interference compensation techniques in direct-detection subcarrier modulation Systems" by Zhe Li et al, Optics Express, Vol. 24, Issue 25, pp. 29176-29189 (2016), describes some algorithms, which may be suitable for use in SSBI estimator 1220. This article is incorporated herein by reference in its entirety.

Figure 13:
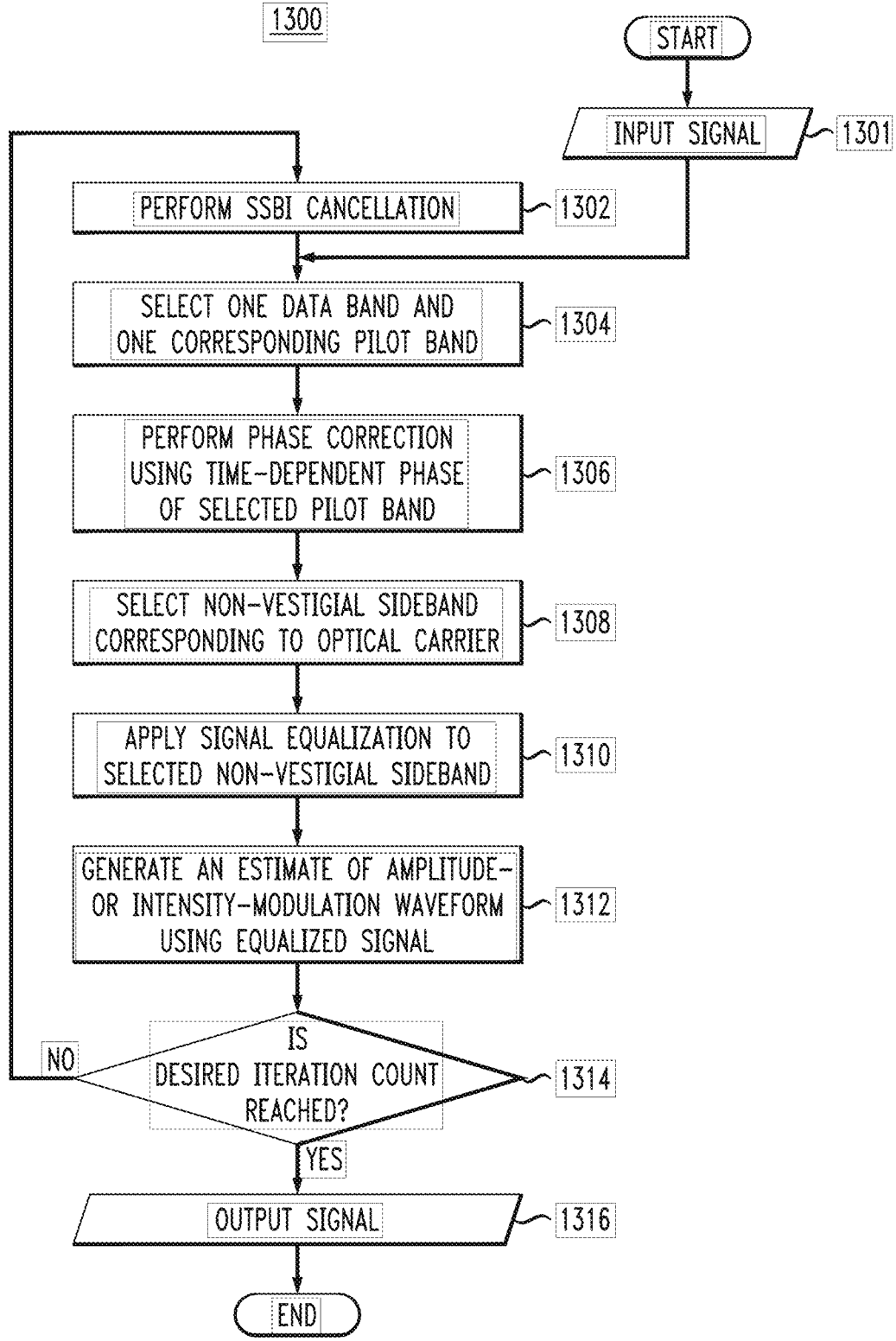
FIG. 13 shows a flowchart of a signal-processing method that can be implemented in in the optical data receiver of FIG. 6 or FIG. 8 according to an embodiment.

FIG. 13 shows a flowchart of a signal-processing method 1300 that can be implemented in DSP 630 (FIG. 6 or 8) according to an embodiment. In an example embodiment, method 1300 may be implemented using digital circuit 1200 (FIG. 12).

At step 1301 of method 1300, DSP 630 receives a portion of digital signal 622 for iterative processing. Said portion may have digital samples corresponding to one or more time slots (symbol intervals). For the first (initial) iteration, switch 1209 is in the open state, and step 1302 is bypassed. For the second iteration and further iterations (if any), switch 1209 is in the connected state, and the processing of method 1300 is looped through step 1302.

At step 1302 of method 1300, DSP 630 operates to compute an SSBI estimate and subtract the computed estimate from the digital form of the output signal generated by single-ended photodetector 610, thereby performing approximate SSBI cancelation. The spectrum of a resulting baseband signal (e.g., 1212, FIG. 12) typically has two data bands (e.g., $704_1$ and $704_2$, FIG. 11A) and two pilot bands (e.g., $710_1$ and $710_2$, FIG. 11A, or $706_1$ and $706_2$, FIG. 7A), but does not have the corresponding SSBI band (such as 708, FIG. 7B). In an example embodiment, step 1302 can be implemented, e.g., using SSBI-estimation circuit 1220 and adder 1210 (FIG. 12), e.g., according to one of the algorithms of the above-cited article.

Note that, as used herein, the term "pilot band" or "pilot signal" covers both (i) the baseband bands corresponding to the residual carrier (e.g., residual carrier 302, FIG. 5A) and (ii) the baseband bands corresponding to the optical pilots (e.g., optical pilots $312_1$ and $312_2$, FIG. 5B).

At step 1304, DSP 630 performs digital filtering configured to select one of the two data bands (e.g., $704_2$, FIG. 11B) and the corresponding one of the two pilot bands (e.g., $710_2$, FIGS. 11B, 11C). In an example embodiment, step 1304 can be implemented, e.g., using a Hilbert-transform circuit (e.g., 1010, FIG. 10) or other functionally similar digital filter.

At step 1306, DSP 630 performs phase correction using the time-dependent phase $\varphi(t)$ of the pilot band selected at step 1304. As already indicated above, this phase correction significantly reduces the detrimental effects of the relative phase noise of optical frequency-reference oscillator 412 and optical carrier 212. In an example embodiment, step 1306 can be implemented, e.g., using digital circuits 1020 and 1030 (FIG. 10).

At step 1308, DSP 630 performs digital filtering of the phase-corrected signal (e.g., 1032, FIG. 10) generated at step 1306. In an example embodiment, the digital filtering of step 1308 is configured to remove the vestigial sideband (e.g., 1108b, FIG. 11E) and select the other (i.e., non-vestigial) sideband (e.g., 1108a, FIG. 11F) of the phase-corrected signal. Herein, the "sidebands" are the sidebands corresponding to the optical carrier 212. In an example embodiment, step 1308 can be implemented, e.g., using digital circuits 1040 and 1050 (FIG. 10).

At step 1310, DSP 630 applies signal equalization to the sideband selected at step 1308. In an example embodiment, the signal equalization of step 1310 may include chromatic-dispersion compensation and be further directed at reducing signal distortions, e.g., caused by the analog front end of transmitter 110 and/or by the analog front end of receiver 130 and/or distortions related the polarizations, such polarization-mode dispersion. In an example embodiment, step 1310 can be implemented, e.g., using digital circuits 1060 and 1070 (FIG. 10) or other suitable digital filter.

At step 1312, DSP 630 uses the equalized signal (e.g., 1052', FIG. 10) generated at step 1310 to generate an estimate of the real-valued amplitude- or intensity-modulation waveform (e.g., 232, FIG. 2) originally used at the corresponding transmitter 130. In an example embodiment, step 1312 can be implemented, e.g., using the C/R signal converter 1080 (FIG. 10).

Step 1314 controls the exit from the processing loop 1302-1312. If the desired iteration count is reached, then the computed-signal readout is performed at step 1316. Otherwise, the processing of method 1300 is directed back to step 1302. In an example embodiment, the number of performed iterations per input signal portion may be two, including the initial iteration that bypasses step 1302 and the next iteration that includes step 1302.

FIG. 14 graphically and schematically illustrates expected example performance improvements according to an embodiment. More specifically, the performance data presented in FIG. 14 show estimates of bit error rate (BER) as a function of transmission distance for a direct-detection optical data receiver configured to receive a 60 Gbaud PAM-4 signal. The 3-dB bandwidth $B_R$, of this receiver is 33 GHz.

A curve 1402 corresponds to a conventional direct-detection receiver. In this case, the detrimental effects of chromatic dispersion in the optical fiber cause the BER to sharply increase only after several kilometers. However, a conventional direct-detection receiver does not provide for electronic dispersion compensation.

A curve 1404 corresponds to optical data receiver 130 configured to use method 1300. In this case, the received optical field can be reconstructed, e.g., at step 1308, which enables subsequent electronic dispersion compensation, e.g., at step 1310. Comparison of curves 1402 and 1404 clearly shows that the transmission distance can be significantly increased, e.g., from about 3 km to about 40 km while maintaining similar BER performance, when an example embodiment is used.

According to an example embodiment disclosed above, e.g., in the summary section and/or in reference to any one or any combination of some or all of FIGS. 1-14, provided is an apparatus comprising an optical data receiver that comprises: a photodiode detector (e.g., 602, FIG. 6); and a digital signal processor (e.g., 630, FIG. 6) connected to receive digital measurements of light by the photodiode detector at a sequence of times, the digital signal processor being configured to recover a data stream (e.g., 232, FIGS.

2, 10) of an optical input signal from the digital measurements, each of the measurements measuring one or more combinations of the optical input signal and an optical frequency reference (e.g., 412, FIG. 5B) at one of times, the optical input signal having a data component (e.g., S, S*, FIGS. 5A, 5B) produced by data-modulating an optical carrier and a pilot peak (e.g., 312, FIG. 5B) produced by modulating the optical carrier with a pilot frequency tone (e.g., 234, FIG. 2); and wherein the digital signal processor is configured to adjust said digital measurements to compensate for a frequency offset of the optical carrier with respect to the optical frequency reference based on evaluations of a phase or frequency of the pilot peak.

In some embodiments of the above apparatus, the data-modulation is according to a pulse-amplitude modulation constellation having at least four symbol values.

In some embodiments of any of the above apparatus, the pilot peak has a center frequency located near an edge of a frequency spectrum of the data component.

In some embodiments of any of the above apparatus, photodiode detector is configured to produce the digital measurements with a lower bandwidth than a bandwidth of the one or more combinations.

In some embodiments of any of the above apparatus, the photodiode detector is configured to remove a substantial portion of a frequency bandwidth of the optical input signal.

In some embodiments of any of the above apparatus, the digital signal processor is configured to recover the data from about a half of the bandwidth of the data component.

According to another example embodiment disclosed above, e.g., in the summary section and/or in reference to any one or any combination of some or all of FIGS. 1-14, provided is an apparatus comprising an optical data receiver that comprises: a front-end circuit (e.g., 610, FIG. 6; 930/940, FIG. 9); and a digital signal processor (e.g., 630, FIGS. 6, 9) connected to receive, from the front-end circuit, digital measurements of one or more combinations of an optical input signal and an optical frequency reference at corresponding times, the optical input signal including a data band and a pilot peak produced by modulating an optical carrier with a data stream and a pilot frequency tone, respectively; wherein the front-end circuit has a narrower output bandwidth than a bandwidth of the one or more combinations of the optical input signal and the optical frequency reference; and wherein the digital signal processor is configured to determine the data stream modulated onto the optical carrier by adjusting the digital measurements to compensate for a frequency offset between the optical input signal and the optical frequency reference based on estimations from the digital measurements of a phase or frequency of the pilot peak of the optical input signal.

In some embodiments of the above apparatus, the optical data receiver is a direct-detection optical receiver (e.g., 130a, FIG. 6).

In some embodiments of any of the above apparatus, the digital signal processor comprises an SSBI-estimation circuit (e.g., 1220, FIG. 12).

The apparatus of claim 7, wherein the optical data receiver comprises a laser source (e.g., 410, FIGS. 8, 9) configured to generate the optical frequency reference.

In some embodiments of any of the above apparatus, the front-end circuit comprises: a balanced pair of photodiodes (e.g., 930₁, 930₂, FIG. 9) optically connected to receive light from the laser source through an optical hybrid (e.g., 920, FIG. 9); and an electrical amplifier (e.g., 940, FIG. 4) connected to a common electrical terminal of the balanced pair of photodiodes to generate the electrical output signal (e.g., 942, FIG. 9).

In some embodiments of any of the above apparatus, the optical frequency reference is frequency-separated from a spectrum of the optical input signal.

In some embodiments of any of the above apparatus, the optical carrier is suppressed in the optical input signal.

In some embodiments of any of the above apparatus, the digital signal processor comprises a phase-correction circuit (e.g., 1030, FIG. 10) configured to reduce effects of relative phase noise between the optical frequency reference and the optical carrier based on evaluations of said pilot peak from the digital measurements.

In some embodiments of any of the above apparatus, the digital signal processor comprises an electronic dispersion compensator (e.g., 1060, FIG. 10) to at least partially compensate for distortions of the optical input signal caused by chromatic dispersion.

In some embodiments of any of the above apparatus, the digital signal processor comprises one or more digital filters (e.g., 1010, 1050, FIG. 10) configured to select from the digital measurements a signal component thereof (e.g., 1108a, FIG. 11F) representing a non-vestigial modulation sideband of the optical carrier.

In some embodiments of any of the above apparatus, at least one (e.g., 1050, FIG. 10) of the one or more digital filters is configured to perform a Hilbert transform.

According to yet another example embodiment disclosed above, e.g., in the summary section and/or in reference to any one or any combination of some or all of FIGS. 1-14, provided is an apparatus comprising an optical data receiver (e.g., 130, FIG. 1) that comprises a front-end circuit connected to a signal processor (e.g., 630, FIGS. 6, 9), the front-end circuit including a photodetector (e.g., 610, FIG. 6; 930/940, FIG. 9) configured to generate an electrical output signal (e.g., 612, FIG. 6; 942, FIG. 9) in response to an optical input signal applied thereto; wherein the front-end circuit has a limited (e.g., in accordance with Eq. (1)) electrical bandwidth (e.g., $B_{Rx}$, FIG. 7A) with respect to an optical bandwidth (e.g., $B_{OS}$, FIGS. 5A, 5B) of the optical input signal, the optical bandwidth including an optical reference oscillator (e.g., 412, FIGS. 5A, 5B) and modulation sidebands (e.g., S, S*, FIGS. 5A, 5B) of an optical carrier; and wherein the signal processor is capable of digitally reconstructing an optical field of the optical input signal by processing a digital form (e.g., 622, FIGS. 6, 9) of the electrical output signal using a signal component thereof corresponding to an optical pilot (e.g., 302, FIG. 5A; 312, FIG. 5B) present in the optical input signal.

In some embodiments of the above apparatus, the optical data receiver is a direct-detection optical receiver (e.g., 130a, FIG. 6).

In some embodiments of any of the above apparatus, the signal processor comprises an SSBI-estimation circuit (e.g., 1220, FIG. 12) connected to remove an estimated SSBI component (e.g., 708, FIGS. 7A, 7B) from the digital form of the electrical output signal.

In some embodiments of any of the above apparatus, the optical reference oscillator is generated at a corresponding optical data transmitter (e.g., 110b, FIG. 4).

In some embodiments of any of the above apparatus, the optical data receiver comprises a laser source (e.g., 410, FIGS. 8, 9) configured to generate the optical reference oscillator.

In some embodiments of any of the above apparatus, the photodetector comprises: a balanced pair of photodiodes (e.g., 930₁, 930₂, FIG. 9) optically connected to receive light from the laser source through an optical hybrid (e.g., 920, FIG. 9); and an electrical amplifier (e.g., 940, FIG. 4) connected to a common electrical terminal of the balanced pair of photodiodes to generate the electrical output signal (e.g., 942, FIG. 9).

In some embodiments of any of the above apparatus, the optical pilot comprises residual light (e.g., 302, FIG. 5A) of the optical carrier.

In some embodiments of any of the above apparatus, the optical pilot (e.g., 312, FIG. 5B) has a first non-zero frequency offset (e.g., $f_{RF}$, FIG. 2) from the optical carrier.

In some embodiments of any of the above apparatus, the optical reference oscillator has a second non-zero frequency offset from the optical carrier that is greater than the first non-zero frequency offset.

In some embodiments of any of the above apparatus, the optical carrier is suppressed in the optical input signal.

In some embodiments of any of the above apparatus, the signal processor comprises a phase-correction circuit (e.g., 1030, FIG. 10) configured to reduce effects of relative phase noise between the optical reference oscillator and the optical carrier based on said signal component.

In some embodiments of any of the above apparatus, the signal processor comprises an electronic dispersion compensator (e.g., 1060, FIG. 10) configured to reduce signal distortions caused by chromatic dispersion.

In some embodiments of any of the above apparatus, the signal processor comprises one or more digital filters (e.g., 1010, 1050, FIG. 10) configured to select from the digital form of the electrical output signal a signal component thereof (e.g., 1108a, FIG. 11F) representing a non-vestigial modulation sideband of the optical carrier.

In some embodiments of any of the above apparatus, at least one (e.g., 1050, FIG. 10) of the one or more digital filters is configured to perform a Hilbert transform.

In some embodiments of any of the above apparatus, the modulation sidebands are intensity-modulation sidebands or amplitude-modulation sidebands.

While this disclosure includes references to illustrative embodiments, this specification is not intended to be construed in a limiting sense.

For example, some embodiments are described above in reference to a bandwidth-limited optical receiver. However, this should not be construed as an essential feature because at least some embodiments can similarly be implemented using an optical receiver whose bandwidth $B_R$), is substantially the same or larger than the bandwidth $B_{OS}$ of the received optical signal.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods described herein.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising an optical data receiver that comprises:
    a detector to output a single electrical signal in response to a combination of an optical data signal and an optical frequency reference, the single electrical signal representing a photocurrent generated by one photodiode of the detector, the optical data signal having a data component produced by data-modulating an optical carrier and a pilot peak produced by modulating the optical carrier with a pilot frequency tone; and
    a digital signal processor connected to receive digital measurements of the photocurrent at a sequence of times, the digital signal processor being configured to recover a data stream of the optical data signal from the digital measurements; and
    wherein the digital signal processor is configured to adjust said digital measurements to compensate for a frequency offset of the optical carrier with respect to the optical frequency reference based on evaluations of a phase or a frequency of the pilot peak.

2. The apparatus of claim 1, wherein the data-modulation is according to a pulse-amplitude modulation constellation having at least four symbol values.

3. The apparatus of claim 1, wherein the pilot peak has a center frequency located near an edge of a frequency spectrum of the data component.

4. The apparatus of claim 1, wherein the detector is configured to output the single electrical signal with a lower bandwidth than a bandwidth of the combination.

5. The apparatus of claim 1, wherein the detector is configured to remove a substantial portion of a frequency bandwidth of the optical data signal.

6. The apparatus of claim 1, wherein the digital signal processor is configured to recover the data stream based on between 55% and 90% of the bandwidth of the data component.

7. The apparatus of claim 1, wherein the optical data receiver is a direct-detection optical receiver.

8. The apparatus of claim 7, wherein the digital signal processor comprises a signal-to-signal beat interference (SSBI)-estimation circuit.

9. The apparatus of claim 1, wherein the optical data receiver comprises a laser source configured to generate the optical frequency reference.

10. The apparatus of claim 1, wherein the optical frequency reference is frequency-separated from a spectrum of the optical data signal.

11. The apparatus of claim 1, wherein the digital signal processor comprises a phase-correction circuit configured to reduce effects of relative phase noise between the optical frequency reference and the optical carrier based on evaluations of the phase of said pilot peak from the digital measurements.

12. The apparatus of claim 1, wherein the digital signal processor comprises an electronic dispersion compensator to at least partially compensate for distortions of the optical data signal caused by chromatic dispersion.

13. The apparatus of claim 1, wherein the digital signal processor comprises one or more digital filters configured to select from the digital measurements a signal component thereof representing a non-vestigial modulation sideband of the optical carrier.

14. The apparatus of claim 13, wherein at least one of the one or more digital filters is configured to perform a Hilbert transform.

15. An apparatus comprising an optical data receiver that comprises a front-end circuit connected to a signal processor, the front-end circuit including a detector configured to generate a single electrical output signal in response to an optical input signal applied thereto, the single electrical output signal representing a photocurrent produced by one or two photodiodes of the detector;
    wherein the front-end circuit is configured to remove a substantial portion of a frequency bandwidth of one or more combinations of the optical input signal and an optical reference oscillator, the frequency bandwidth including modulation sidebands of an optical carrier; and
    wherein the signal processor is capable of estimating an optical field of the optical input signal by processing digital measurements of the photocurrent using a signal component thereof corresponding to an optical pilot present in the optical input signal.

16. The apparatus of claim 15, wherein the optical data receiver is a direct-detection optical receiver.

17. The apparatus of claim 15, wherein the signal processor comprises a phase-correction circuit configured to reduce effects of relative phase noise between the optical reference oscillator and the optical carrier based on said signal component.

18. The apparatus of claim 15, wherein the signal processor is capable of estimating a phase of a data component of the optical input signal by processing the digital measurements.

19. The apparatus of claim 1,
wherein the one photodiode is connected in a single-ended electrical configuration; and
wherein the digital signal processor is capable of estimating a phase of the optical data signal by processing the digital measurements.

20. An apparatus comprising an optical data receiver that comprises:
a detector to output a single electrical signal in response to combinations of an optical data signal and an optical frequency reference, the single electrical signal representing a photocurrent generated by two photodiodes of the detector, the optical data signal having a data component produced by data-modulating an optical carrier and a pilot peak produced by modulating the optical carrier with a pilot frequency tone; and
a digital signal processor connected to receive digital measurements of the photocurrent at a sequence of times, the digital signal processor being configured to recover a data stream of the optical data signal from the digital measurements; and
wherein the digital signal processor is configured to adjust said digital measurements to compensate for a frequency offset of the optical carrier with respect to the optical frequency reference based on evaluations of a phase or a frequency of the pilot peak.

21. The apparatus of claim 20,
wherein the optical data receiver comprises a laser source configured to generate the optical frequency reference;
wherein the two photodiodes are electrically connected to form a balanced pair of photodiodes and optically connected to receive light from the laser source through an optical hybrid; and
wherein the detector comprises an electrical amplifier connected to a common electrical terminal of the balanced pair of photodiodes to generate the single electrical signal.

\* \* \* \* \*